United States Patent [19]
Petersen

[11] Patent Number: 5,860,672
[45] Date of Patent: Jan. 19, 1999

[54] AIRBAG BAFFLE MOUNT

[75] Inventor: Kurt L. Petersen, North Ogden, Utah

[73] Assignee: Morton International, Inc., Chicago, Ill.

[21] Appl. No.: 753,357

[22] Filed: Nov. 25, 1996

[51] Int. Cl.[6] .................................................. B60R 21/16
[52] U.S. Cl. ...................................... 280/728.2; 280/740
[58] Field of Search ................................ 280/728.2, 740, 280/742, 736

[56] References Cited

U.S. PATENT DOCUMENTS

| | | | |
|---|---|---|---|
| 4,068,862 | 1/1978 | Ishi et al. | 280/740 |
| 4,178,017 | 12/1979 | Ishi et al. | 280/740 |
| 4,183,550 | 1/1980 | Sudou | 280/743 |
| 4,830,401 | 5/1989 | Honda | 280/736 |
| 4,902,036 | 2/1990 | Zander et al. | 280/736 |
| 5,193,846 | 3/1993 | Allard | 280/728 |
| 5,246,249 | 9/1993 | Satoh | 280/740 |
| 5,308,110 | 5/1994 | Kokeguchi | 280/728.2 |
| 5,378,011 | 1/1995 | Rogerson et al. | 280/728.1 |
| 5,382,046 | 1/1995 | Cuevas | 280/728.2 |
| 5,462,305 | 10/1995 | Hamada | 280/728.2 |
| 5,505,488 | 4/1996 | Allard | 280/740 |
| 5,509,685 | 4/1996 | Boyle, III | 280/728.2 |

FOREIGN PATENT DOCUMENTS 3604843   8/1987   Germany.

*Primary Examiner*—Brian L. Johnson
*Assistant Examiner*—Andrew J. Fischer
*Attorney, Agent, or Firm*—George W. Rauchfuss, Jr.

[57] ABSTRACT

An airbag baffle mount for mounting an airbag cushion to an airbag module and for deflecting hot inflation gas away from a throat of the airbag cushion. The airbag baffle mount includes a generally flat retainer ring for securing the collar of the airbag cushion around an inflator of the airbag module that produces and expels the inflation gas from a plurality of inflation ports for inflating the airbag cushion upon a vehicle collision. The airbag baffle mount also includes a continuous deflection baffle extending upwardly from the retainer ring and positioned spaced-apart from the inflator, between the plurality of inflation ports of the inflator and the surrounding throat of the airbag cushion. The deflection baffle slopes substantially inwardly for deflecting hot inflation gas and hot particles downwardly generally towards the retainer ring to thereby substantially prevent the throat of the airbag cushion from being burned by the hot inflation gas and decrease the release of hot particles into the main part of the airbag cushion.

14 Claims, 4 Drawing Sheets

AIRBAG BAFFLE MOUNT

FIELD OF THE INVENTION

The present invention relates to an airbag module and, more particularly, to an airbag baffle mount for mounting an airbag cushion within the airbag module and for deflecting hot inflation gas away from a throat of the airbag cushion.

BACKGROUND OF THE INVENTION

An airbag retainer ring is used for retaining an airbag cushion within an airbag module. An airbag module is employed in a vehicle, particularly an automobile, for protecting an occupant against injury by deploying an inflated airbag cushion to physically restrain the occupant's body when the automobile encounters a collision. A driver side airbag module normally includes an airbag cushion, an inflator for inflating the airbag cushion upon receiving a signal from a remote collision sensor, and a module baseplate mounting the airbag cushion and inflator. The inflator generally has a cylindrical sidewall extending through an inflator-receiving aperture of the module baseplate and an inflator flange extending radially outwardly from the sidewall and abutting a bottom surface of the baseplate. The airbag cushion has an open mouth formed by a collar that fits around the inflator with the collar positioned against a top surface of the baseplate. An airbag retainer ring is positioned on the collar of the airbag cushion and fits around the inflator sidewall, and fasteners such as bolts pass through the airbag retainer ring, the collar of the airbag cushion, the baseplate and the inflator flange and are fastened with nuts for example to secure the airbag module together.

During inflation of the airbag cushion, hot inflation gas radially exits the inflator through inflation ports in the inflator sidewall. It has been found that the hot inflation gas radially exiting the inflator can burn a "throat" of the airbag cushion extending from the collar and surrounding the inflator sidewall.

In order to avoid burning the airbag cushion, some airbag retainer rings include a perpendicular sidewall for deflecting the inflation gas to protect the collar and the throat of the airbag cushion. The perpendicular sidewall is spaced-apart from the inflator sidewall and extends up at least to a height equal with the inflation ports of the inflator. The perpendicular sidewall, therefore, intercepts the inflation gas and directs the inflation gas parallel with the inflator sidewall and generally axially into the airbag cushion.

While it is preferable that the inflation gas is directed away from the collar and the throat of the airbag cushion, it is also preferable that the inflation gases are directed radially into the airbag cushion. Radial inflation causes the airbag cushion to expand radially and evenly over the steering wheel, or "flatten out", and be fully inflated before an occupant is carried, by the force of deceleration caused by a collision of the vehicle, into the fully inflated and correctly positioned airbag cushion. In contrast, it has been found that axial inflation can cause the airbag cushion to be propelled axially and unevenly or "skewered", straight out of the airbag module towards the occupant until the airbag cushion reaches its maximum extension, and only then begin to fully inflate. Skewered inflation is unwanted because it can cause the top of airbag cushion to strike the occupant before being fully inflated. Skewered inflation can also cause the airbag cushion to push the occupant to the side of the inflating airbag cushion so that the occupant does not receive the protection of the inflated airbag cushion. Skewered inflation additionally places severe stress on the throat and the collar of the airbag cushion. While an airbag retainer ring having the perpendicular sidewall provides better protection against burning of the collar and throat of the airbag cushion, the perpendicular sidewall is believed to direct the inflation gas generally axially into the airbag cushion and, therefore, can encourage unwanted skewered inflation of the airbag cushion.

In order to reduce the chances of skewered inflation of the airbag cushion, some airbag retainer rings include an outwardly sloping sidewall, i.e. a sidewall that angle away from the inflator, as opposed to a perpendicular sidewall. The outwardly sloping sidewall intercepts and directs the inflation gas both axially and radially into the airbag cushion, and, therefore, reduces the chances of skewered inflation. The outwardly sloping sidewall, however, does not reduce cushion burning as well as the perpendicular sidewall. Accordingly, an airbag cushion used with a airbag retainer ring having an outwardly sloping sidewall may still need to incorporate a cushion tether to combat skewered inflation, and may also need protective layers of material positioned around the inside of its throat to combat airbag cushion burning.

It would be useful, therefore, to provide a cushion retainer that protects an airbag cushion from burning yet directs inflation gas into the airbag cushion such that the airbag cushion does not skewered upon inflation.

SUMMARY OF THE INVENTION

A general object, therefore, of the present invention is to provide a new and improved airbag module.

A more specific object of the present invention is to provide a new and improved airbag retainer ring.

Another object of the present invention is to provide an airbag retainer ring that protects an airbag cushion from the hot inflation gases of an inflator.

An additional object of the present invention is to provide an airbag retainer ring that does not encourage skewered inflation of an airbag cushion.

In carrying out this invention, there is provided an airbag baffle mount for mounting an airbag cushion to an airbag module also including an inflator having a sidewall defining a plurality of inflation ports and a module baseplate surrounding the inflator sidewall below the plurality of inflation ports. The airbag cushion includes a throat surrounding the inflator sidewall and terminating in a collar seated on the module baseplate so that inflation gas exiting the inflation ports of the inflator will inflate the airbag cushion.

The airbag baffle mount includes a generally flat retainer ring receivable between the inflator sidewall and the throat of the airbag cushion and over the collar of the airbag cushion. The retainer ring is securable to the module baseplate with the collar of the airbag cushion clamped therebetween.

The airbag baffle mount also includes a continuous deflection baffle extending upwardly from the retainer ring and, when the airbag module is assembled, positioned between the plurality of inflation ports of the inflator sidewall and the throat of the airbag cushion. The deflection baffle has a distal edge positioned between a top of the inflator sidewall and the plurality of inflation ports and spaced-apart from the inflator sidewall. The deflection baffle slopes substantially inwardly for deflecting hot inflation gas and solid particles exiting the plurality of inflation ports of the inflator downwardly generally towards the retainer ring. The deflection baffle thereby substantially prevents the throat of the airbag cushion from being burned and substantially prevents the hot solid particles from being distributed into the airbag cushion.

According to one aspect of the present invention, the retainer ring is generally flat and the deflection baffle slopes substantially inwardly at an angle of between about forty-five and about eighty degrees with respect to the retainer ring. According to another aspect of the present invention, the deflection baffle slopes substantially inwardly at an angle of about sixty degrees with respect to the retainer ring.

According to an additional aspect of the present invention, the airbag baffle mount additionally includes a continuous support wall extending upwardly from the retainer ring, with the deflection baffle sloping inwardly from the support wall.

The present invention also provides an airbag module including an airbag baffle mount as described above. The airbag module also includes an inflator having an inflator sidewall defining a plurality of spaced-apart inflation ports, a module baseplate surrounding the inflator sidewall below the plurality of inflation ports, and an airbag cushion including a throat surrounding the inflator sidewall and terminating at a collar seated on the module baseplate so that inflation gas exiting the inflation ports will inflate the airbag cushion.

The generally flat retainer ring of the airbag baffle mount is received between the inflator sidewall and the throat of the airbag cushion and over the collar of the airbag cushion. The retainer ring is fastened to the module baseplate with the collar of the airbag cushion secured therebetween. The continuous deflection baffle of the airbag baffle mount is positioned between the plurality of inflation ports of the inflator sidewall and the throat of the airbag cushion, with the distal edge of the deflection baffle spaced-apart from the inflator sidewall and positioned between a top of the inflator sidewall and the plurality of inflation ports. The deflection baffle slopes substantially inwardly towards the inflator to deflect hot inflation gas and solid particles exiting the plurality of inflation ports downwardly generally towards the retainer ring.

The present invention, thereby, provides an airbag baffle mount that substantially prevents the throat of the airbag cushion from being burned. In addition, it has been found that the airbag baffle mount according to the present invention does not encourage skewered inflation of the airbag cushion.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
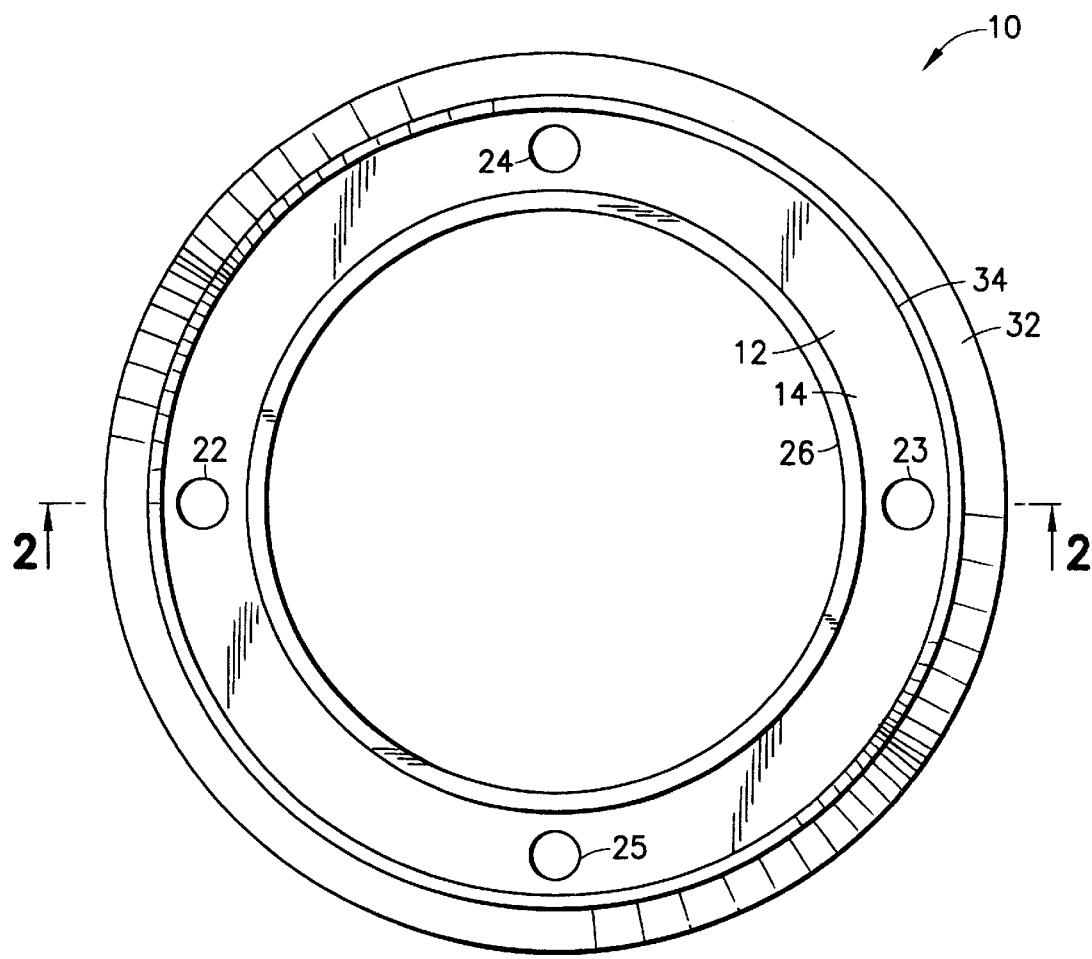
FIG. 1 is a top plan view of an airbag baffle mount according to the present invention.
Figure 2:
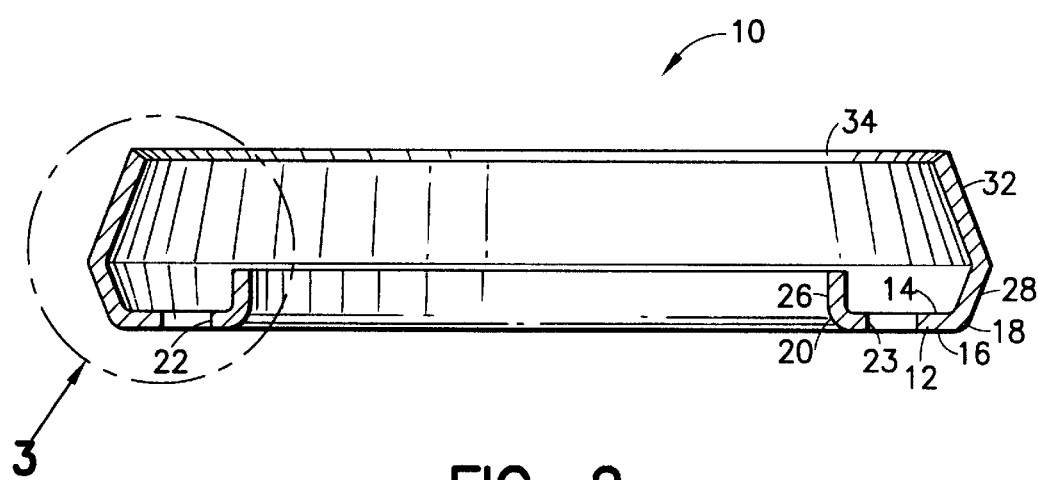
FIG. 2 is a cross-sectional view of the airbag baffle mount of FIG. 1, taken along the line 2—2 of FIG. 1.
Figure 3:
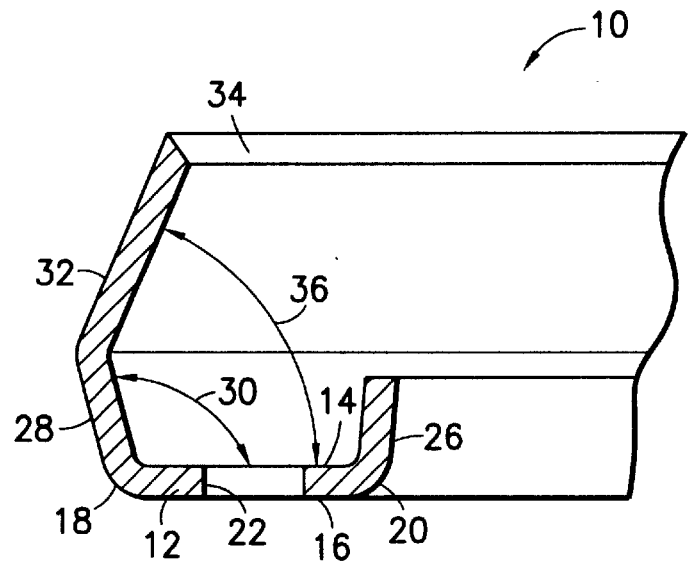
FIG. 3 is an enlarged cross-sectional view of a portion of the airbag module contained in the circle 3 of FIG. 2.

Referring first to FIGS. 1 through 3, the present invention provides an airbag baffle mount 10 fabricated from a suitably rigid and strong material, such as reinforced nylon or a similar plastic for example, or metals such as steel or aluminum for example. The airbag baffle mount 10 includes a generally flat, circular retainer ring 12 having a top surface 14, a bottom surface 16, an outer edge 18 and an inner edge 20. It should be noted that the retainer ring 12 can be provided with an outer edge generally forming a square with rounded corners. The retainer ring 12 defines four equally spaced-apart fastener receiving openings 22,23,24,25. Alternatively, a plurality of bolts may be insert molded into the retainer ring 12, as is known in the art.

The airbag baffle mount 10 also includes a continuous inner wall 26 extending upwardly from the top surface 14 of the retainer ring 12 adjacent the inner edge 20 of the retainer ring. The inner wall 26 is unitary with and generally perpendicular to the retainer ring 12. A continuous support wall 28 extends upwardly from the top surface 14 of the retainer ring 12 adjacent the outer edge 18 of the retainer ring. The support wall 28 is unitary with the retainer ring 12 and slopes substantially outwardly in a direction away from the inner edge 20. By substantially outwardly it is meant that the support wall 28 slopes outwardly at an angle of between about one hundred (100) and about one hundred and thirty (130) degrees with respect to the retainer ring 12. Preferably, as shown in FIG. 3, the support wall 28 slopes outwardly at an angle 30 of about one hundred and ten (110) degrees with respect to the retainer ring 12. It should be noted that, alternatively, the support wall could be perpendicular to the retainer ring 12.

The airbag baffle mount 10 additionally includes a continuous deflection baffle 32 extending upwardly from the support wall 28 to a distal edge 34. The deflection baffle 32 slopes substantially inwardly. By inwardly it is meant that the deflection baffle 32 slopes so that the distal edge 34 is radially closer to the inner edge 20 of the retainer ring 12 than the support wall 28 from which the deflection baffle extends. By substantially inwardly it is meant that the deflection baffle 32 slopes inwardly at an angle of between about forty-five (45) and about eighty (80) degrees with respect to the retainer ring 12. Preferably, as shown in FIG. 3, the deflection baffle 32 slopes inwardly at an angle 36 of about sixty (60) degrees with respect to the retainer ring 12.

Figure 4:
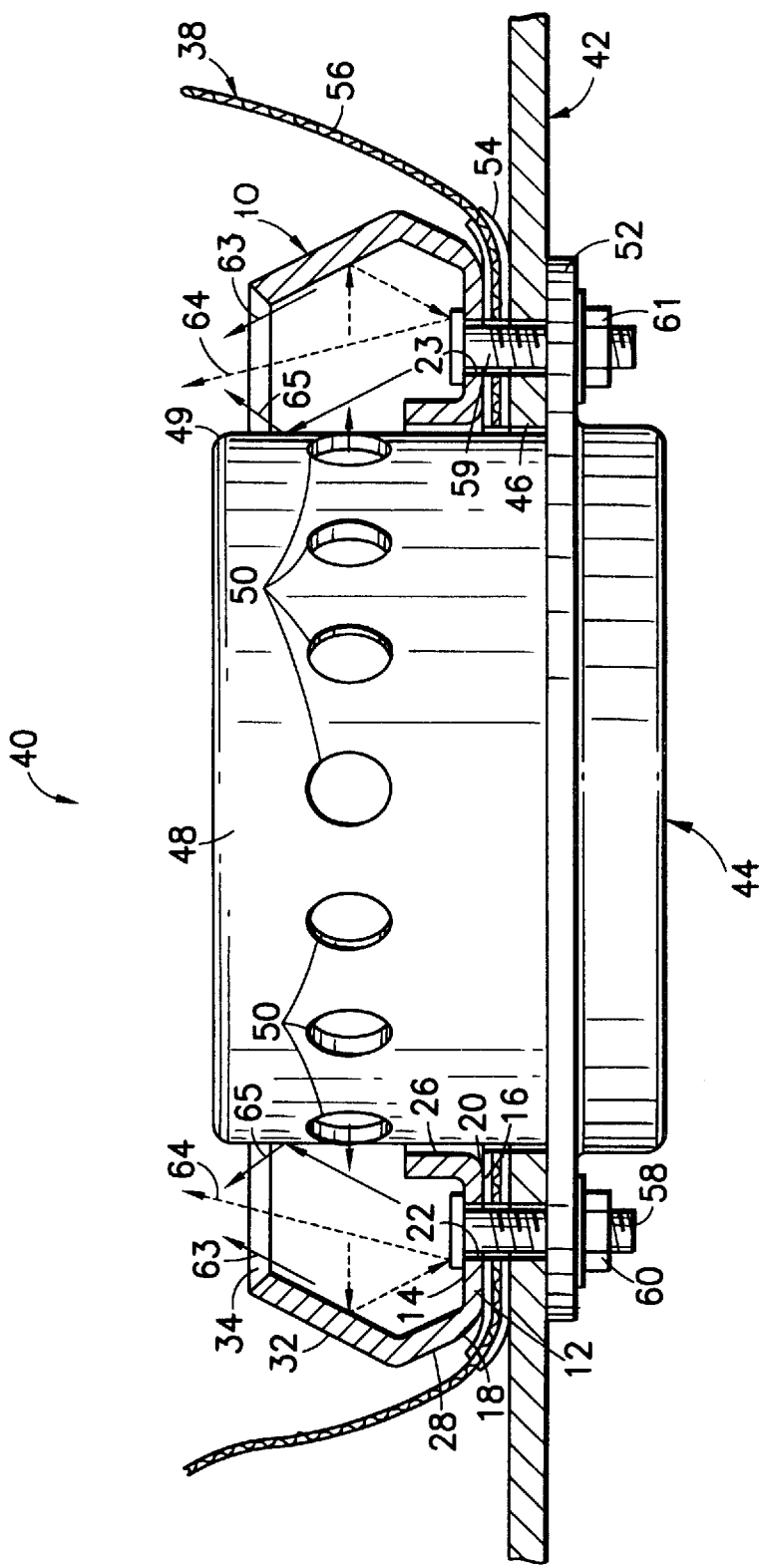
FIG. 4 is a side elevational view, partially in section, of an airbag module incorporating the airbag baffle mount of FIG. 1, showing inflation gas exiting an inflator being deflected by a deflection baffle of the airbag baffle mount.

Referring to FIG. 4, the airbag baffle mount 10 is for mounting an inflatable airbag cushion 38 within an airbag module 40 also including a module baseplate 42 and an airbag inflator 44. The module baseplate 42 defines an inflator-receiving aperture 46 receiving a cylindrical inflator sidewall 48 of the airbag inflator 44. The airbag inflator 44 has an inflator flange 52 extending radially outwardly from the sidewall 48 below a plurality of gas exhaust ports 50 defined by the inflator sidewall and abutting the module baseplate 42. The airbag cushion 38 has a collar 54 defining an open mouth, with the collar positioned on the module baseplate 42. The airbag cushion 38 also includes a throat 56 extending from the collar 54 and surrounding the inflator sidewall 48.

The airbag baffle mount 10 is received between the inflator sidewall 48 and the throat 56 of the airbag cushion 38, with the bottom surface 16 of the retainer ring 12 positioned on top of the collar 54 of the airbag cushion. Four fasteners in the form of threaded bolts 58,59 (only two are shown) pass through the fastener receiving openings 22,23 of the retainer ring 12, through the collar 54 of the airbag cushion 38, through the module baseplate 42 and through the inflator flange 52 and are fastened with four nuts 60,61 (only two are shown) to secure the airbag baffle mount 10 and the airbag inflator to the module baseplate with the collar of the airbag cushion clamped between the retainer ring and the baseplate.

Both of the continuous inner wall 26 and the continuous support wall 28 extend upwardly from the retainer ring 12 to below the plurality of inflation ports 50 of the inflator 44, thereby not blocking the plurality of inflation ports. The continuous deflection baffle 32 is positioned between the plurality of inflation ports 50 and the throat 56 of the airbag cushion 38, with the distal edge 34 of the deflection baffle spaced-apart from the inflator sidewall 48 and positioned between a top 49 of the inflator sidewall and the plurality of inflation ports. It should be noted, however, that the airbag baffle mount 10 can be provided without the inner wall 26 and the support wall 28, and that deflection baffle 32 can extend from the top surface 14 of the retainer ring 12 anywhere between the inner edge 20 and the outer edge 18 of the retainer ring, as long as the deflection baffle is positioned between the plurality of inflation ports 50 of the inflator 44 and the throat 56 of the airbag cushion 38, with the distal edge 34 of the deflection baffle spaced-apart from the inflator sidewall 48 and positioned between the top 49 of the inflator sidewall and the plurality of inflation ports.

As is known in the art, the airbag inflator 44 contains means for producing inflation gas, indicated by arrows 64 in the figures, such as pellets of pyrotechnic gas generant or a stored compressed inert gas with a solid pyrotechnic initiator, for example. Generally, the inflatable airbag cushion 38 will inflate upon receiving inflation gas from the inflator 44 during a vehicle collision to provide a cushion between the vehicle occupant and interior portions of the vehicle. As shown, the inflation gas 64 exits the inflator 44 through the plurality of inflation ports 50. The inflation gas 64 exits at a high pressure and temperature and can contain solid particles as a by-product of combustion within the inflator 44. The deflection baffle 32, sloping substantially inwardly towards the inflator 44, deflects most of the hot inflation gas and solid particles 64 exiting the plurality of inflation ports 50 generally downwardly towards the retainer ring 12. Preferably, the support wall 28 and the deflection baffle 32 of the airbag baffle mount 10 are angled with respect to the retainer ring 12 so that a majority of the inflation gas 64 deflected off the deflection baffle is directed off the top surface 14 of the retainer ring (and the heads of the bolts 58,59) and straight between the distal edge 34 of the deflection baffle and the top 49 of the inflator sidewall 48. The hot solid particles, which have a greater density and weight than the inflation gas 64, mainly settle on the retainer ring 12.

The airbag baffle mount 10 according to the present invention provides relatively excellent burn protection from the hot inflation gas 64 for the throat 56 and the collar 54 of the airbag cushion 38 and prevents most of the hot solid particles contained within the inflation gas from being distributed into the airbag cushion.

Figure 5:
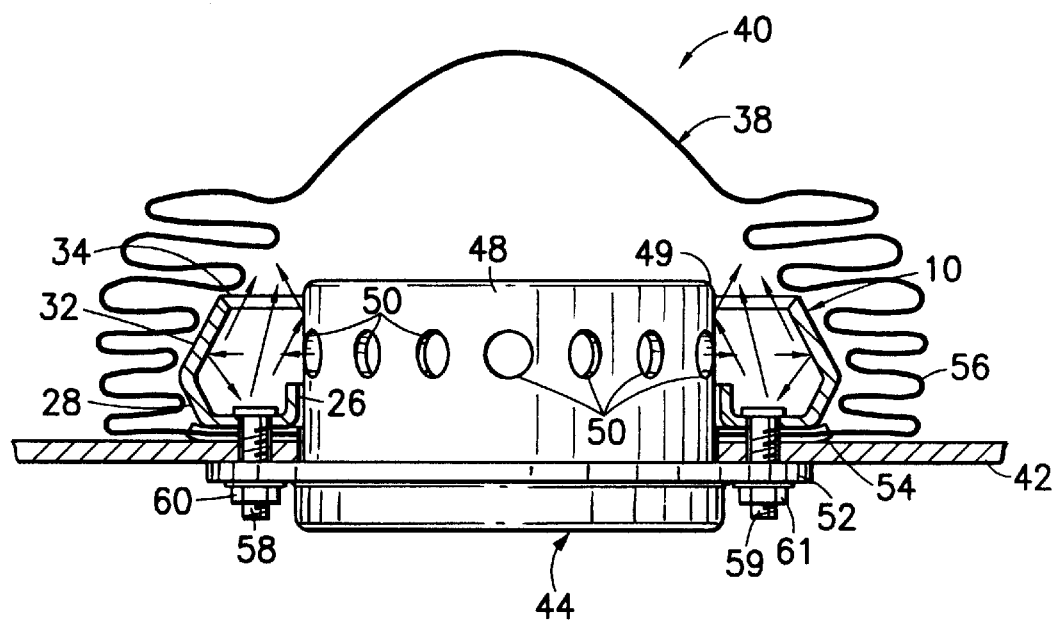
FIG. 5 is a side plan view of an airbag cushion of the airbag module of FIG. 4 during initial inflation.
Figure 6:
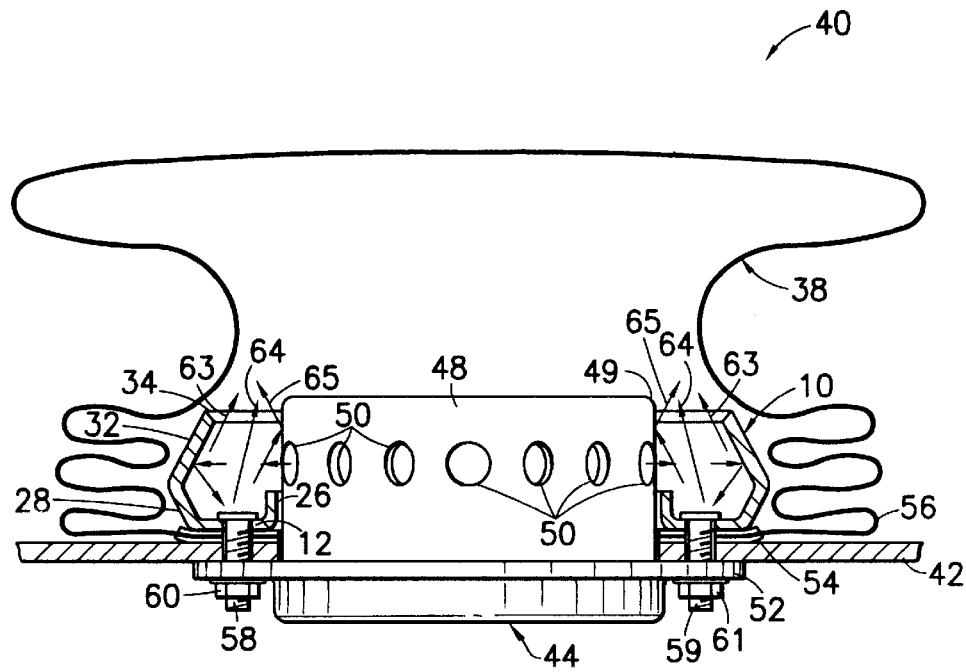
FIG. 6 is a side plan view of an airbag cushion of the airbag module of FIG. 4 partially inflated.
Figure 7:
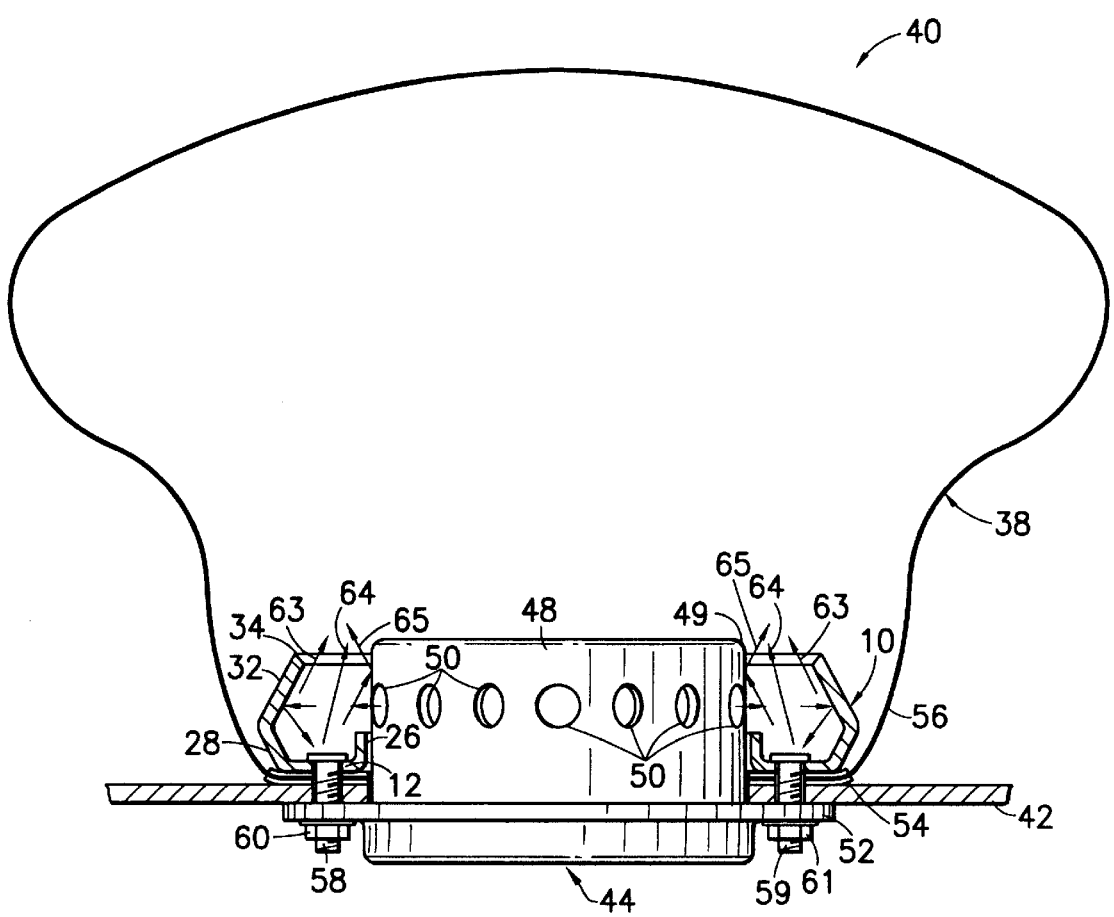
FIG. 7 is a side plan view of the airbag cushion of the airbag module FIG. 4 fully inflated.

It was assumed that an inwardly sloping deflection baffle, such as the inwardly sloping deflection baffle 32 of the airbag baffle mount 10, by directing inflation gas inwardly, would cause the airbag cushion 38 to skewer undesirably upon inflation. Surprisingly, however, it has been found that although the inwardly sloping deflection baffle 32 does cause the airbag cushion 38 to skewer initially during about the first fifteen milliseconds (15 ms) of inflation as shown in FIG. 5, the inwardly sloping deflection baffle thereafter causes the airbag cushion to inflate evenly and nicely flatten out as desired at about thirty milliseconds (30 ms) after initiation of the inflator, as shown in FIG. 6, so that the airbag cushion can properly fully inflate at about fifty milliseconds (50 ms) after initiation of the inflator, as shown in FIG. 7. This may be a result of a portion of the inflation gas, indicated by arrows 65 in the figures, being deflected off the inflator sidewall 48 so that that portion of the inflation gas is directed somewhat radially outwardly with respect to the airbag inflator 44. In addition, a portion of the inflation gas, indicated by arrows 63 in the figures, is deflected off the deflection baffle 32 directly into the airbag cushion 38 so that that portion of the inflation gas is directed somewhat radially inwardly with respect to the airbag inflator 44. The inflation gas, therefore, is thoroughly diffused and directed both radially inwardly and outwardly with respect to the airbag inflator 44 to encourage the airbag cushion 38 to evenly inflate. The present invention, therefore, provides an airbag baffle mount 10 that protects the airbag cushion 38 from burning, yet directs inflation gas into the airbag cushion such that the airbag cushion does not skewer upon inflation.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An airbag baffle mount for mounting an airbag cushion to an airbag module also including an inflator having a sidewall defining a plurality of spaced-apart inflation ports and a module baseplate surrounding the inflator sidewall below the plurality of inflation ports, the airbag cushion including a throat surrounding the inflator sidewall and terminating in a collar seated on the module baseplate so that inflation gas exiting the inflation ports of the inflator will inflate the airbag cushion, the airbag baffle mount comprising:

a retainer ring receivable between the inflator sidewall and the throat of the airbag cushion and over the collar of the airbag cushion, the retainer ring securable to the module baseplate with the collar of the airbag cushion clamped therebetween; and a continuous deflection baffle extending upwardly from the retainer ring and when the retainer ring is secured to the baseplate, positioned between the plurality of inflation ports of the inflator sidewall and the throat of the airbag cushion, the deflection baffle having a distal edge spaced-apart from the inflator sidewall and positioned between a top of the inflator sidewall and the plurality of inflation ports, the deflection baffle sloping substantially inwardly for deflecting hot inflation gas and solid particles exiting the plurality of inflation ports downwardly generally towards the retainer ring, to thereby substantially prevent the throat of the airbag cushion from being burned and substantially prevent the hot solid particles from being distributed into the airbag cushion.

2. An airbag baffle mount according to claim 1 wherein the retainer ring is generally flat and the deflection baffle slopes substantially inwardly at an angle of between about forty-five and about eighty degrees with respect to the retainer ring.

3. An airbag baffle mount according to claim 2 wherein the deflection baffle slopes substantially inwardly at an angle of about sixty degrees with respect to the retainer ring.

4. An airbag baffle mount according to claim 3 further comprising a continuous support wall extending upwardly from a top surface of the retainer ring adjacent an outer edge of the retainer ring, with the deflection baffle sloping inwardly from the support wall.

5. An airbag baffle mount according to claim 4 wherein the support wall slopes substantially outwardly.

6. An airbag baffle mount according to claim 5 further comprising an inner wall extending upwardly from the top surface of the retainer ring adjacent an inner edge of the retainer ring.

7. An airbag baffle mount according to claim 6 wherein the retainer ring defines a plurality of spaced-apart fastener receiving openings for receiving a plurality of fasteners extending through the collar of the airbag cushion and the module baseplate to secure the retainer ring to the module baseplate.

8. An airbag module comprising:
   A) an inflator having a sidewall defining a plurality of spaced-apart inflation ports;
   B) a module baseplate surrounding the inflator sidewall below the plurality of inflation ports;
   C) an airbag cushion including a throat surrounding the inflator sidewall and terminating in a collar seated on the module baseplate so that inflation gas exiting the inflation ports will inflate the airbag cushion; and
   D) an airbag baffle mount including,
   a retainer ring received between the inflator sidewall and the throat of the airbag cushion and positioned over the collar of the airbag cushion, the retainer ring fastened to the module baseplate with the collar of the airbag cushion secured therebetween, and
   a continuous deflection baffle extending upwardly from the retainer ring and positioned between the plurality of inflation ports of the inflator sidewall and the throat of the airbag cushion, the deflection baffle having a distal edge spaced-apart from the inflator sidewall and positioned between a top of the inflator sidewall and the plurality of inflation ports, the deflection baffle sloping substantially inwardly towards the inflator to deflect hot inflation gas and solid particles exiting the plurality of inflation ports generally downwardly towards the retainer ring, thereby substantially preventing the throat of the airbag cushion from being burned and substantially preventing the hot solid particles from being distributed into the airbag cushion.

9. An airbag module according to claim 8 wherein the retainer ring is generally flat and the deflection baffle slopes substantially inwardly towards the inflator at an angle of between about forty-five and about eighty degrees with respect to the retainer ring.

10. An airbag module according to claim 9 wherein the deflection baffle slopes substantially inwardly towards the inflator at an angle of about sixty degrees with respect to the retainer ring.

11. An airbag module according to claim 10 wherein the airbag baffle mount further includes a continuous support wall extending upwardly from a top surface of the retainer ring adjacent an outer edge of the retainer ring to below the plurality of the inflation ports of the inflator, the deflection baffle sloping inwardly from the support wall.

12. An airbag module according to claim 11 wherein the support wall of the airbag baffle mount slopes outwardly away from the inflator.

13. An airbag module according to claim 12 wherein the airbag baffle mount further includes an inner wall extending upwardly from the top surface of the retainer ring adjacent an inner edge of the retainer ring to below the plurality of inflation ports of the inflator.

14. An airbag module according to claim 13 wherein the retainer ring of the airbag baffle mount defines a plurality of spaced-apart fastener receiving openings and the retainer ring is fastened to the module baseplate by a plurality of fasteners extending through the plurality of fastener receiving openings of the retainer ring and through the collar of the airbag cushion and the module baseplate.

\* \* \* \* \*